UNITED STATES PATENT OFFICE.

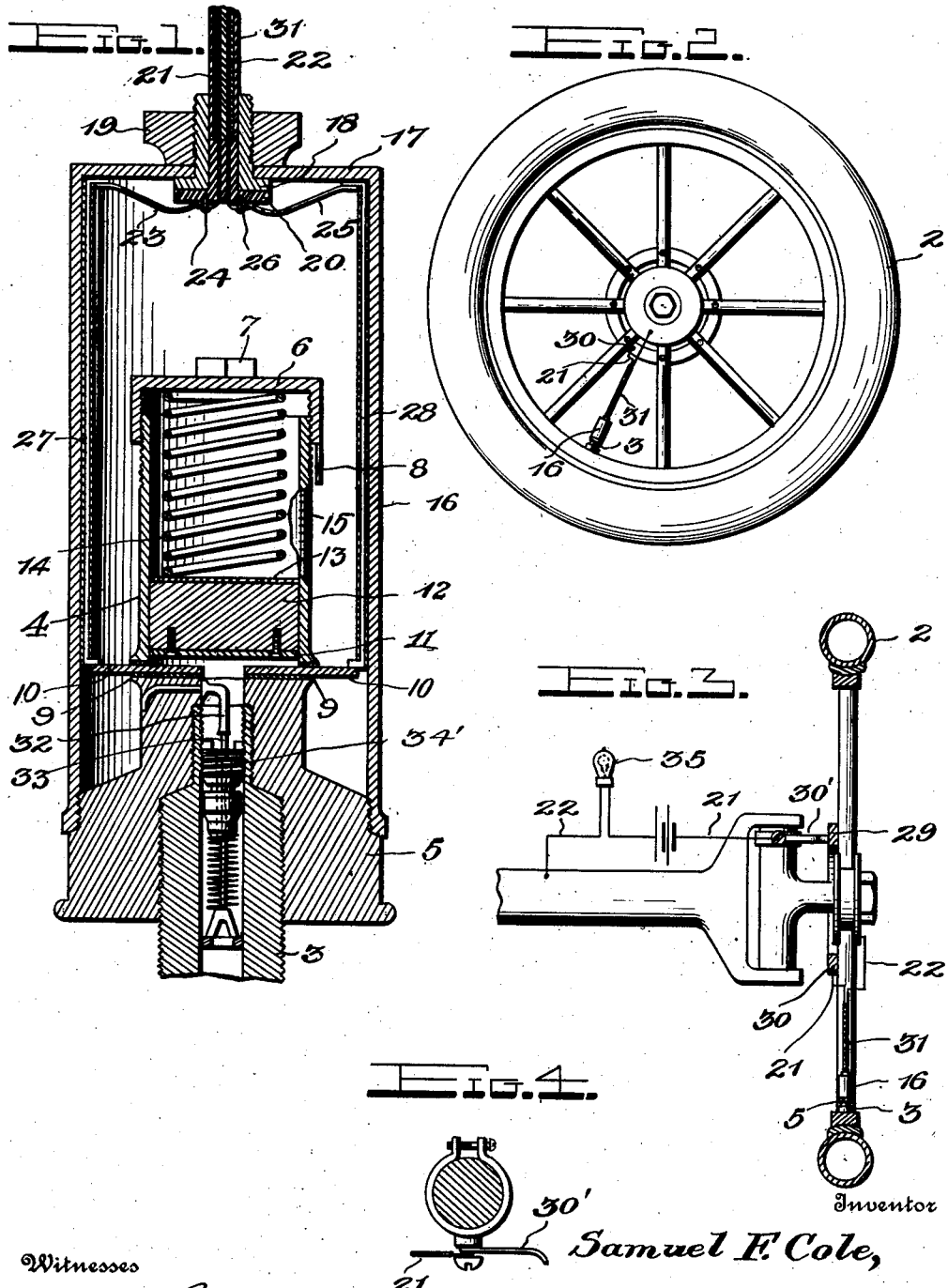

SAMUEL F. COLE, OF PURCELLVILLE, VIRGINIA.

INDICATOR FOR PNEUMATIC TIRES.

1,167,980.  Specification of Letters Patent.  Patented Jan. 11, 1916.

Application filed August 26, 1914. Serial No. 858,631.

*To all whom it may concern:*

Be it known that I, SAMUEL F. COLE, a citizen of the United States, residing at Purcellville, in the county of Loudoun and State of Virginia, have invented certain new and useful Improvements in Indicators for Pneumatic Tires, of which the following is a specification.

The invention relates generally to electrical indicators, but more particularly to means for indicating the deflation of pneumatic tires; and it consists of a novelly-constructed attachment adapted to be fitted to the ordinary filling-tube of such tires, whereby the deflation of a tire may be indicated by displaying a signal or sounding an alarm.

The chief object of the invention is the production of a novelly-constructed pressure circuit-closer, which can be set to a pressure lower than that within the tire, so that when the pressure within the tire has become reduced, from any cause whatever, to that of the set or fixed pressure, said circuit closer will operate to close the circuit to a signal device.

Another object of the invention is to so construct and arrange the several parts of the attachment that it can be readily fitted to the filling-tube of the tire without in any way interfering with or affecting the use of said filling-tube.

Other objects of the invention will become apparent upon the detailed description and operation thereof.

In the drawing Figure 1 is a central, longitudinal section of my improved attachment, somewhat enlarged, as fitted to the filling-tube of a pneumatic tire, a portion of the filling-tube being broken away; Fig. 2, is a side view of an ordinary automobile wheel, showing my attachment applied thereto, Fig. 3 a similar view of one end of a front axle and a cross-section of the wheel, showing the electrical connections and a signal, and Fig. 4 is a cross section showing the method of securing the brush and conductor to the wheel.

Referring to the several views, the numeral 2 indicates a pneumatic-tired wheel, and 3 the filling-tube thereof of ordinary construction, excepting that the closure-cap is dispensed with. Screwed upon the filling-tube is a tube 4 provided with an enlarged head 5. The upper portion of the tube 4 is externally screw-threaded to receive a screw-threaded, flanged cap 6 which is provided with a central boss or hub 7, adapted to receive a wrench or other tool for forcing down the cap, for a purpose to be hereinafter explained, flange of said cap being provided with a pointer 8 adapted to indicate the pounds pressure marked on the tube 4, as will be referred to later on. The tube 4 is provided with oppositely-disposed insulated apertures 9, 9, through which project contact-strips 10, 10 and located above the inwardly-projecting ends of the contact-strips is a metal disk or armature 11 which is fastened to a block of insulating material 12, said disk or armature being adapted to make contact with the contact-strips. Seated upon the insulating block is a disk 13, preferably metal, against which impinges one end of a coil-spring 14, the other end of said coil-spring abutting against the cap 6, which when screwed upon the tube 4 will compress the spring any number of pounds desired, marks indicating pounds-pressure being arranged on a strip 15 attached to the outer wall of said tube 4, or they may be arranged on the tube itself, and with which the pointer is adapted to register.

The tube 4 is inclosed by a tube 16 screwed upon the enlarged end of the tube 4, and has its head 17 centrally apertured to receive a short, flanged-tube 18 fitting loosely within said aperture so as to provide a swiveling movement. The upper portion of the flanged-tube 18 is externally screw-threaded to receive a screw-threaded clamping-nut 19 for firmly attaching and holding said flanged-tube to said head of the tube 16, and projecting into the flanged tube is a flanged-insulating-block 20, through which pass the positive and negative conductors 21 and 22, respectively, the conductor 21 being in contact with a spring-conductor or contact 23, and the conductor 22 in contact with a spring-conductor or contact 25, the conductor 21 and spring-conductor 23 being secured to the insulating-block 20 by binding-screw 24, while conductors 22 and 25 are secured to said insulating-block by binding-screw 26. The free end of spring-conductor 23 contacts with one end of a conductor 27, the other end of said conductor 27 being in contact with one of the contact-strips 10, and the free end of spring-conductor 25 contacts with one end of a conductor 28 being in contact with the other contact-strip 10, both conductors 27 and 28 being insulated from the wall of the tube 16.

In applying the attachment to wooden wheels, a metal ring 29, of suitable conductivity, is fastened directly to the spokes thereof, as shown in Fig. 2, but if the spokes are metal the ring should be properly insulated therefrom. The conductor 21 is connected with said ring by means of a brush 30' which is secured at any convenient point on the hub of the wheel which if metal must be suitably insulated therefrom, or said brush may be secured to any other part of the running-gear of the vehicles adjacent to the wheel, and the conductor 22 is grounded in the hub and axle of the wheel, as shown in Fig. 3. The conductors 21 and 22 are preferably incased within a flexible tube 31, so as to protect them from possible injury by reason of shock or jar.

Secured to the inner wall of the tube 4, at any convenient place, is an angle-piece 32 provided with a concave head 33, adapted to fit over the end of the valve-stem of the filling-tube and hold the valve away from its seat in the perforated disk 34, so as to allow the compressed air within the tire to pass through the perforations in said disk and impinge against the metal disk or armature 11, and by its greater force hold said disk or armature normally out of contact with the contact-strips 10, 10, thereby providing a normal open circuit which will remain open until the air-pressure within the tire has been, by leakage or otherwise, reduced to the pressure exerted by the spring 14.

The form of signal I prefer to use is an incandescent lamp, as shown at 35, Fig. 3, the wire 21 leading from one pole of a battery 36, or other source of electrical supply, to the metal ring 29, and the wire 22 running from the other pole to the wheel-hub.

In operation, the pressure-cap 6 is screwed down, compressing the spring 14, until the pointer registers with the number of pounds-pressure desired below that of the air-pressure contained within the tire, for example—if the air-pressure within the tire is about eighty-pounds and the pressure-cap forced down upon the spring until it should exert a force equal to, say sixty-pounds, the air-pressure within the tire would hold the armature out of contact with the contact-strips until the pressure within the tire equaled sixty-pounds, when the circuit would instantly close and the signal be displayed or sounded, as the case may be, thus warning the driver of a tire being deflated, which if permitted to continue would probably result in serious injury to the tire. It will be understood that each wheel of the vehicle is to be provided with the indicator-attachment, so that deflation of any one or all of the tires may be indicated. When it is desired to fill or refill a tire with air, the clamping-nut 19 is slightly loosened which will permit the attachment to be readily unscrewed from the filling-tube without twisting the conductors 21 and 22, as the tube 16 will swivel around the flanged-tube 18.

Various modifications or changes in the details of construction of my attachment may be made without limiting the scope of my invention or departing from the principle thereof.

Having thus fully described my invention, what I claim is—

1. An indicating device for pneumatic tires, comprising outer and inner tubes; contact-strips within the inner tube; an armature arranged to make contact with the contact-strips; a pressure-means situated within said inner tube, and a circuit-closer adapted to be brought into operation by the decreased pressure of air within the tire.

2. An indicating device, comprising outer and inner tubes; a pressure-means within the inner tube; contact-strips extending into the inner tube; conductors in contact with the contact-strips, and an armature adapted to make contact with the contact-strips.

3. A device for indicating the deflation of a pneumatic tire, having in combination, outer and inner tubes; a pressure-means within the inner tube, adapted to be set to a predetermined pressure; a flanged-tube swiveled in the head of the outer tube; adjustable means for clamping the flanged-tube to said head; a flanged, insulating block fitted into the flanged-tube; contact-strips in the inner tube, and an armature adapted to make contact with the contact-strips, when the pressure within the tire has become reduced to the predetermined pressure.

In testimony whereof I affix my signature, in presence of two witnesses.

SAMUEL F. COLE.

Witnesses:
JOHN H. COLE,
RUSSEL LORD-WOOD.